United States Patent

Come et al.

(10) Patent No.: US 7,299,820 B2
(45) Date of Patent: Nov. 27, 2007

(54) HYDRAULIC FLUID RESERVOIR

(75) Inventors: Philippe Come, Senlis (FR);
Emmanuel Fraisse, Paris (FR);
François Gaffe, Rosny Sous Bois (FR);
Remi Demersseman, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 440 days.

(21) Appl. No.: 10/518,981

(22) PCT Filed: Jun. 25, 2003

(86) PCT No.: PCT/EP03/06688

§ 371 (c)(1),
(2), (4) Date: Dec. 21, 2004

(87) PCT Pub. No.: WO2004/002798

PCT Pub. Date: Jan. 8, 2004

(65) Prior Publication Data

US 2006/0048848 A1    Mar. 9, 2006

(30) Foreign Application Priority Data

Jun. 28, 2002  (FR) .................................. 02 08166

(51) Int. Cl.
*B60T 11/26*       (2006.01)

(52) U.S. Cl. ........................................ 137/574; 60/585

(58) Field of Classification Search ................ 137/574; 60/585, 592

See application file for complete search history.

(56) References Cited

U.S. PATENT DOCUMENTS

| 3,989,056 | A | * | 11/1976 | Reinartz | 137/574 |
| 4,026,319 | A | * | 5/1977 | Pickering | 60/585 |
| 4,170,877 | A | * | 10/1979 | Pickering | 137/574 |
| 4,217,922 | A | * | 8/1980 | Come | 60/592 |
| 4,355,512 | A | * | 10/1982 | Kubota et al. | 60/585 |
| 4,414,810 | A | * | 11/1983 | Reinartz et al. | 60/585 |
| 4,513,774 | A | * | 4/1985 | Reid | 137/574 |
| 5,590,527 | A | * | 1/1997 | Shaw | 60/585 |
| 6,178,747 | B1 | * | 1/2001 | Tang | 60/585 |
| 6,205,783 | B1 | * | 3/2001 | Harris et al. | 60/585 |
| 6,571,556 | B2 | * | 6/2003 | Shinohara et al. | 60/585 |
| 6,913,040 | B2 | * | 7/2005 | Crossman et al. | 137/574 |

FOREIGN PATENT DOCUMENTS

JP           11208447           8/1999

* cited by examiner

*Primary Examiner*—John Rivell
(74) *Attorney, Agent, or Firm*—Leo H. McCormick, Jr.; Sarah Taylor

(57) ABSTRACT

In order to prevent hydraulic fluid infiltrating out from a hydraulic fluid tank (1) when a vehicle is in operation, the invention provides for the tank to be compartmentalized by an anti-overflow partition (16). The anti-overflow partition is made in such a manner as to hold air captive inside the tank in the vicinity of a feed orifice (11) at a location placed in a top portion of said anti-overflow partition.

4 Claims, 2 Drawing Sheets

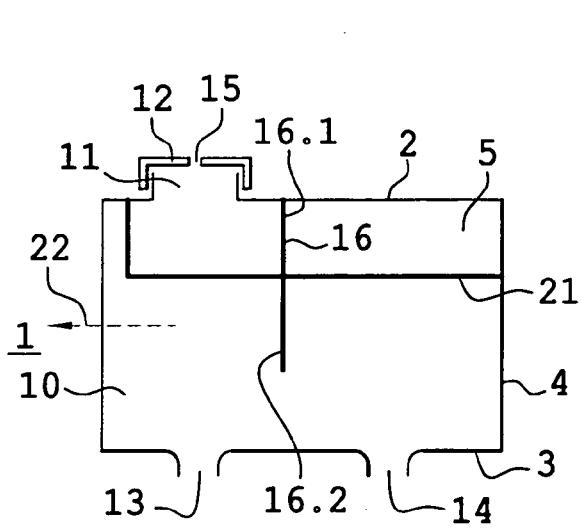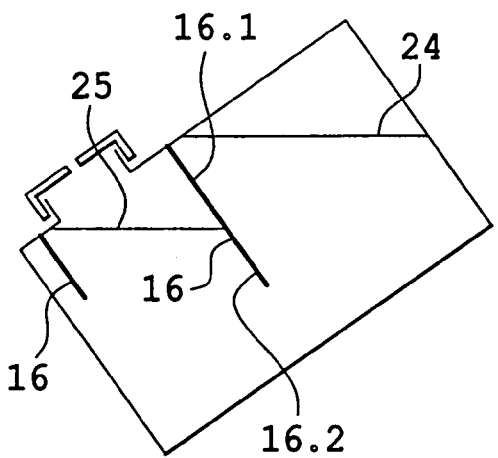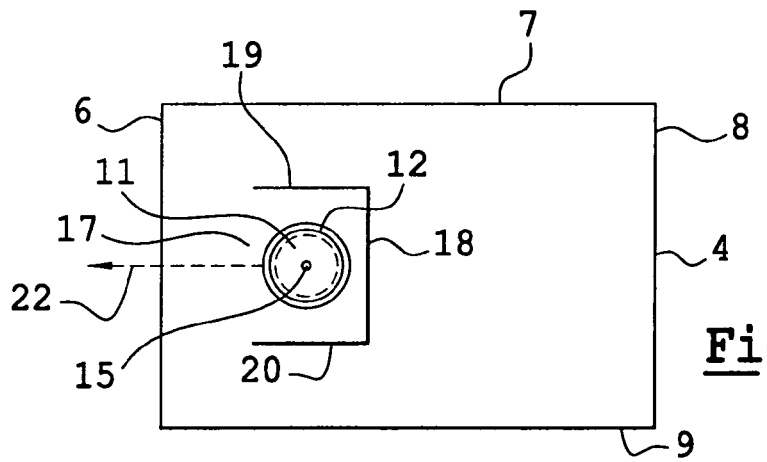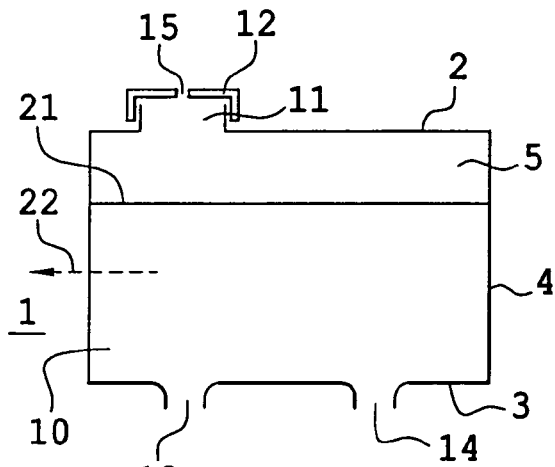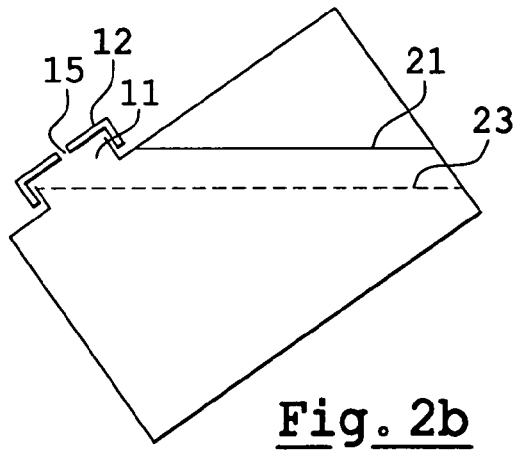

HYDRAULIC FLUID RESERVOIR

The invention relates to a hydraulic fluid tank. In particular, the invention relates to a hydraulic fluid tank for a vehicle. An object of the invention is to limit loss of hydraulic fluid from a hydraulic fluid tank. More precisely, the invention seeks to limit hydraulic fluid losses when the vehicle is in operation. The invention is more particularly intended for the automotive industry, but it can also be applied to other fields.

BACKGROUND OF THE INVENTION

In a vehicle, a hydraulic fluid tank serves to feed a hydraulic brake circuit. Specifically, the hydraulic brake circuit may comprise a master cylinder connected to braking apparatus including at least one wheel of the vehicle. In order to feed the hydraulic brake circuit, the hydraulic fluid tank feeds more particularly a primary chamber and a secondary chamber of said master cylinder. Feeding the primary and secondary chambers of the master cylinder enables primary and secondary pistons respectively to compress a volume of hydraulic fluid contained in said chambers and to move brake pads against at least one disk of a vehicle wheel hub. By compressing a volume of hydraulic fluid, at least one vehicle wheel is impeded and the vehicle can brake.

While the vehicle is in use, it is found that abnormal loss of hydraulic fluid occurs from inside the tank. Such loss of hydraulic fluid requires a vehicle driver to verify regularly that the level of hydraulic brake fluid inside the tank is sufficient. The level of hydraulic brake fluid is sufficient so long as there is enough hydraulic fluid inside the tank to ensure that the hydraulic brake circuit will operate. The level of hydraulic fluid therefore needs to be verified by a vehicle user by comparing the level of hydraulic fluid with a mark situated on a wall of the tank, for example. It is tedious that driver safety needs to be ensured by regularly verifying the level of hydraulic fluid in the tank, and adding fluid, when necessary. Regularly adding hydraulic fluid to the tank can also become expensive for the user of the vehicle.

Unfortunately, while the vehicle is in use, the volume of hydraulic fluid inside the tank can be caused to move. More particularly, the hydraulic fluid is caused to move suddenly in a direction of vehicle advance or in an opposite direction whenever the vehicle decelerates or accelerates suddenly. The hydraulic fluid can also move sideways relative to the travel direction of the vehicle, for example when the vehicle is making a turn. The tank may also take up a sloping position relative to the level of hydraulic fluid in the tank when the vehicle is running on a sloping road.

By moving inside the tank, the volume of hydraulic fluid can be caused to cover a tank feed orifice. The hydraulic fluid tank has an orifice for feeding it with hydraulic fluid that is closed by means of a stopper. This stopper covers the feed orifice and is usually screwed into place. When the fluid occupies the feed orifice, hydraulic fluid can escape from the tank by infiltrating between a thread on the feed orifice and a thread on the stopper. The fluid can also escape from the tank via an air vent made in the stopper. The air vent constitutes a small hole allowing air to enter into the tank. Air needs to be admitted in order to make it easier to feed the hydraulic circuit with hydraulic fluid.

In order to prevent fluid escaping from the tank, it is possible to increase the volume of the tank in a vertical direction relative to the vehicle travel direction so that the surface level of the volume of hydraulic fluid inside the tank practically never reaches the feed orifice of the tank while the vehicle is in use. However, increasing the volume of such a tank increases the space it occupies under a vehicle hood. In addition, increasing the volume of the tank does not completely prevent fluid from escaping from the tank.

SUMMARY OF THE INVENTION

To solve this problem of fluid escaping from the tank, the invention provides for the tank to be compartmentalized by means of at least one anti-overflow partition. This anti-overflow partition forms an open compartment inside the tank around and close to the feed orifice of the tank. This anti-overflow partition surrounds the feed orifice at least in part so that when the tank tilts in at least one given direction, a fraction of the volume of air contained inside the tank is held captive in the vicinity of the tank feed orifice. Since the air is held captive, it cannot escape to other locations that are higher up inside the tank. As a result, no suction can be established. The tank then operates like a mercury barometer form which mercury does not escape.

The invention thus provides a hydraulic fluid tank comprising:
- a ceiling and a bottom; and
- a hydraulic fluid feed orifice, which feed orifice is placed in the ceiling and opens out to the outside of the tank, the tank being characterized in that an anti-overflow partition is placed inside the tank extending at least from the ceiling and surrounding the feed orifice at least in part.

The invention will be better understood on reading the following description and on examining the accompanying figures. The figures are given purely by way of indication without limiting the invention.

BRIEF DESCRIPTION OF THE DRAWINGS

FIGS. 1a to 1b are section views of a hydraulic fluid tank of the invention;

FIG. 1c is a plan view of a hydraulic fluid tank of the invention;

FIGS. 2a and 2b are section views of a hydraulic fluid tank; and

DETAILED DESCRIPTION OF THE INVENTION

Figure 3A:
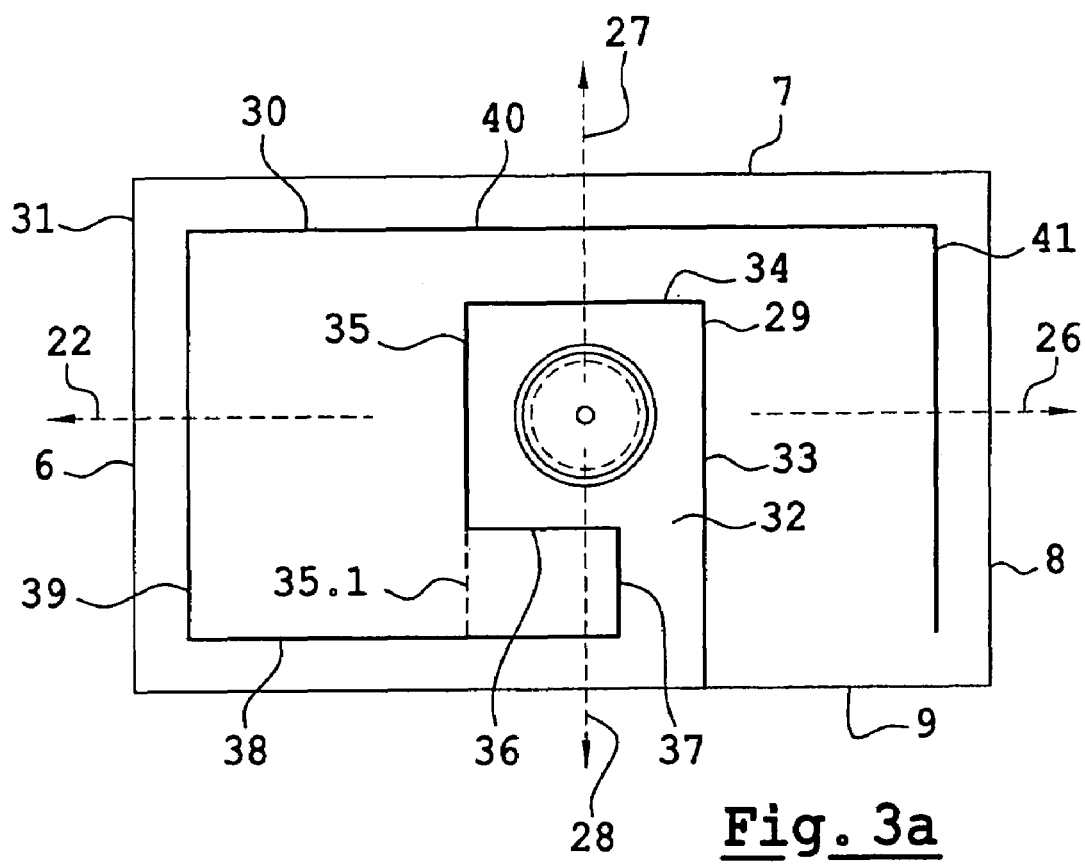
FIGS. 3a and 3b are plan views of a hydraulic fluid tank constituting a variant embodiment of the invention.

FIGS. 1a to 1c show a hydraulic fluid tank of the invention for a vehicle. In FIG. 1a, the hydraulic fluid tank 1 comprises a ceiling 2, a bottom 3, and a wall 4. The bottom, the ceiling, and the wall define an inside volume 5. In the example of FIG. 1a, the inside volume 5 is generally in the shape of a cube, however it could be spherical in shape. In this example, the wall 4 is made up of four sides 6, 7, 8, and 9. These sides are parallel to each other in pairs. In the example, the sides 6 and 8 are parallel to each other. The ceiling 2 and the bottom 3 are disposed in mutually parallel planes. The wall 4 connects the ceiling 2 to the bottom 3. The hydraulic fluid tank is filled with hydraulic fluid 10. The tank is fed with hydraulic fluid via a feed orifice 11 situated at a location in the ceiling 2. In the example of FIG. 1a, the feed orifice is off-center. The feed orifice may also be placed at some other location on the tank. The feed orifice is closed by a stopper 12 positioned on the feed orifice 11. The stopper is in the form of a screw cap that is secured to the feed orifice 11 by being screwed on, but the stopper could be of any other form and it could be secured by any other means. For example the stopper could be secured by resilient engagement or by snap-fastening.

The volume of hydraulic fluid 10 is intended to feed a hydraulic brake circuit. For example, a hydraulic brake circuit may comprise a master cylinder and at least one vehicle wheel (not shown). The volume of hydraulic fluid 10 is intended more particularly to feed a primary chamber and a secondary chamber of a master cylinder (not shown) via a first pipe 13 and a second pipe 14. In order to make it easier to move this volume of hydraulic fluid towards the hydraulic brake circuit and in order to make it easier to move this volume of hydraulic fluid in the opposite direction, the stopper 12 is provided with an air vent 15 that facilitates displacement of the volume of hydraulic fluid without constraint inside the tank.

According to an essential characteristic of the invention, the tank is provided with an anti-overflow partition 16 fixed inside the tank. The anti-overflow partition has a top portion 16.1 and a bottom portion 16.2. The top portion is close to the ceiling. The bottom portion is remote from the ceiling. The anti-overflow partition 16 is secured to the ceiling 2 via its top portion and it surrounds the feed orifice 11 at least in part.

In FIG. 1*a*, which is a section view of the tank of the invention as seen from above, the anti-overflow partition 16 can be seen to be U-shaped. The anti-overflow partition forms an open compartment 17 inside the tank. Because such a compartment is open, the entire tank can be fed with hydraulic fluid.

In the example of FIG. 1*c*, the U-shape comprises a first portion 18, a second portion 19, and a third portion 20. The first portion 18 comprises a plane parallel to the plane defined by two mutually parallel sides of the four sides of the wall 4. In this example, the two sides parallel to this first portion 18 are the sides 6 and 8. The second and third portions 19 and 20 are perpendicular to the first portion 18 occupying planes parallel to the planes defined by the other two sides of the tank. In this example, the other two sides are the sides 7 and 8. The anti-overflow partition 16 forms an open compartment 17 inside the tank and defined by the three above-described portions 18, 19, and 20.

In accordance with the invention, the anti-overflow partition 16 is preferably fixed perpendicularly to the ceiling of the tank. This anti-overflow partition could alternatively be fixed obliquely relative to the ceiling. The anti-overflow partition is preferably fixed to the ceiling of the tank. Under such circumstances, the partition extends part of the way round the orifice. The anti-overflow partition could alternatively be fixed solely to the ceiling of the tank.

At rest, the hydraulic fluid in the tank is situated at a level represented by a line 21 in FIG. 2*a*. At rest, this line 21 occupies a plane parallel to the plane defined by the ceiling 2 and the bottom 3. During acceleration or deceleration of the vehicle, the fluid tends to pile up against a side of the wall of the tank and subsequently to move back into a plane which may be parallel to a plane of the tank at rest. The fluid may also pile up against a side of the tank when the vehicle is traveling along a sloping road.

In order to simulate acceleration or deceleration of the vehicle, the tank may be caused to lean in at least one direction. Causing the tank to lean also serves to simulate the position occupied by such a tank when the vehicle is running on a sloping road. A direction whereby the tank is leaning to the left of the drawing is represented by dashed-line arrow 22 in FIGS. 1*a* and 2*a*.

When the tank is leaning towards the left of the drawing, the tank tilts around the hydraulic fluid and the ceiling of the tank can become partially covered in hydraulic fluid as shown in FIGS. 1*b* and 2*b*.

Without the invention, and as shown in FIG. 2*b*, the feed orifice 11 closed by the stopper of the tank can become immersed in hydraulic fluid when the tank leans in direction 22. The level of hydraulic fluid can then go down from 21 to a level 23. The level 23 is represented by dashed lines in FIG. 2*b*. The level of hydraulic fluid goes down because it is possible to exchange air and the fluid overlying the feed orifice. By overlying the feed orifice, fluid can infiltrate between the thread of the tank feed orifice 11 and the thread of the stopper 12. The fluid can also infiltrate through the air vent 15. The tank thus overflows.

With the invention, and as shown in FIG. 1*b*, the anti-overflow partition 16 prevents the fluid from immersing at least the feed orifice and some of the top portion of the anti-overflow partition. When the tank leans in direction 22, the anti-overflow partition 16 defines a first level 24 and a second level 25. The first level 24 represents the level of the fluid outside the open compartment 17. The second level 25 is constituted by the level of the fluid inside the open compartment 17 formed by the anti-overflow partition 16.

The anti-overflow partition enables air to be held captive in a location situated around the feed orifice. The partition thus prevents the feed orifice from being submerged in hydraulic fluid. In this way, the anti-overflow partition 16 of the present invention makes it possible to avoid hydraulic fluid leaking out from the tank, but only in a single direction 22.

Unfortunately, when the vehicle is in operation, the volume of fluid can move in at least four directions. The fluid can move in direction 22 and also in the opposite direction 26. These two directions 22 and 26 may correspond to the positions occupied by the vehicle tank when the vehicle is running on a road that slopes up or a road that slopes down. The hydraulic fluid may also be moved in two other opposite directions 27 and 28 perpendicular to the travel direction of the vehicle. The directions 26, 27, and 28 are represented by dashed-line arrows in FIGS. 3*a* and 3*b*.

Figure 3B:
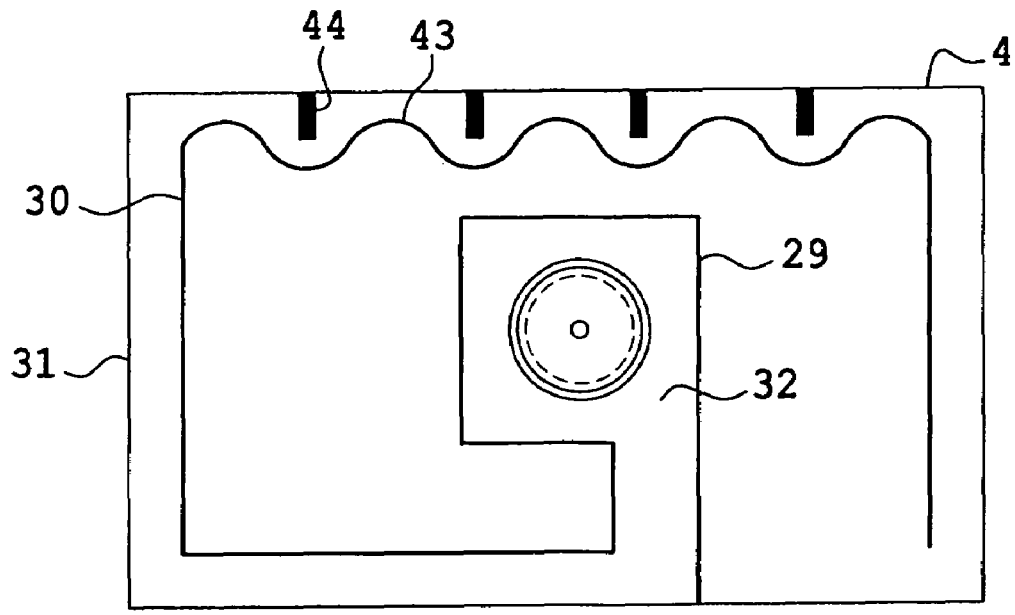

In order to avoid losing hydraulic fluid in at least another one of the four directions 22, 26, 27, and 28, the invention also provides, in a variant shown in FIGS. 3*a* and 3*b*, an anti-overflow partition comprising a first portion 29 extending part of the way round the feed orifice 11, and a second portion 30 extending around the periphery 31 of the tank. An anti-overflow partition made in this way establishes an air flow path inside the tank suitable for isolating the feed orifice from the remainder of the tank. This path is made in such a manner as to allow the tank to tilt in at least the four above-mentioned directions without fluid covering the feed orifice. This anti-overflow partition likewise provides an open compartment 32 inside the tank. The term "periphery" 31 of the tank is used to designate an outline formed by the four sides 6, 7, 8, and 9 of the tank wall 4. This variant presents the advantage of making it possible to reduce the height of the volume of such a tank, which can be useful in reducing the vertical height of a vehicle hood relative to the position occupied by the vehicle on the road. In this variant, the anti-overflow partition is preferably fixed both to the ceiling and to the bottom of the tank.

In this variant, the first portion 29 comprises four wall portions 33, 34, 35, and 36 extending part of the way round the feed orifice, and the second portion 30 comprises four other wall portions 38, 39, 40, and 41. These two portions are interconnected by a wall portion 3'.

A first wall portion 33 extends perpendicularly from a location on one of the four sides of the wall of the tank to a location in the vicinity of the feed orifice. In the example of FIG. 3a, the wall-portion 33 extends from the side 9. Thereafter, this wall portion 33 is extended perpendicularly by a second wall portion 34, itself extended by a third wall portion 35 perpendicular to the second wall portion 34 and parallel to the first wall portion 33. This third wall portion 35 is extended perpendicularly by a fourth wall portion 36. This fourth wall portion 36 is shorter than the second wall portion 34. These four wall portions 33, 34, 35, and 36 are disposed in such a manner as to extend part of the way round the feed orifice. The fourth wall portion 36 is then extended perpendicularly by a fifth wall portion 37 parallel to the first wall portion 33 but not extending as far as the side 9 where the first wall portion 33 is engaged. This fifth wall portion 37 interconnects the portions 29 and 30 of the partition. Thereafter a sixth wall portion 38 extends the fifth wall portion 37 perpendicularly. A seventh wall portion 39 extends the sixth wall portion 38 perpendicularly. This seventh wall portion 39 is extended perpendicularly by an eighth wall portion 40. The eighth wall portion is itself extended by a ninth wall portion 41. The ninth wall portion 41 does not meet any of the four sides of the tank wall. The sixth, seventh, eighth, and ninth wall portions are disposed in such a manner as to extend around the periphery 31 of the tank.

When the tank is caused to lean in direction 26 in FIG. 3a, the anti-overflow partition serves to hold air captive between the second, third, and fourth wall portions 34, 35, and 36. When the tank is caused to lean in direction 27, the anti-overflow partition serves to hold air captive between the first, third, and fourth wall portions 33, 35, and 36. If the third, wall portion 35 were extended by a wall portion 35.1 so as to meet the sixth wall portion 38 directly instead of going via the fourth wall portion 36, then the feed orifice would become immersed in hydraulic fluid in direction 26. When the tank is caused to lean in direction 28, the anti-overflow partition enables air to be held captive between the first, second, and third wall portions 33, 34, and 35.

Other anti-overflow partitions (not shown) of a shape other than that described above could also be implemented. Such anti-overflow partitions can also serve to establish an air flow path inside the tank in such a manner as to isolate the feed orifice 11 from the remainder of the tank. In particular, another anti-overflow partition can be made in such a manner as to be spirally-shaped. With such a shape, the anti-overflow partition can extend part of the way round the feed orifice in such a manner that the anti-overflow partition extends further and further from the feed orifice 11 going towards the periphery 31 of the tank. An anti-overflow partition made in this way can approach the periphery of the tank following a circular path or following a rectangular path.

In order to strengthen such a tank and make it better able to withstand the high pressure that can occur inside the tank, it is possible to provide at least one stiffening rib 44 as shown in FIG. 3b. In this example, the tank may have a plurality of stiffening ribs 44. These stiffening ribs are fixed perpendicularly to at least one of the four sides of the wall 4. These stiffening ribs stiffen the tank. Stiffening the tank can be important because the tank must be capable of withstanding the high pressures that can occur inside the tank while it is being filled on a motor vehicle assembly line.

In another variant, it is possible to reinforce the rigidity of the tank by causing the anti-overflow partition to be corrugated 43, at least in part (FIG. 3b). In the example of FIG. 3b, a series of corrugations can be provided in the portion 30 of the anti-overflow partition. This leaves room for a stiffening rib to be placed in register with each corrugation.

The invention claimed is:

1. A hydraulic fluid tank (1) comprising:
a ceiling (2) and a bottom (3); and
a hydraulic fluid feed orifice (11), said feed orifice is placed in the ceiling and opens out to the outside of the tank, the tank being characterized in that an anti-overflow partition (16) is placed inside the tank extending at least from the ceiling and surrounding the feed orifice at least in part, said tank characterized in that the anti-overflow partition is U-shaped and is fixed solely to the ceiling of the tank, said tank including a wall connecting the ceiling to the bottom, which wall is provided with stiffening ribs (44) that are preferably fixed perpendicularly thereto, said anti-overflow partition comprises a first portion (29) extending part of the way around the feed orifice, and a second portion (30) extending around a periphery (31) of the tank.

2. The tank according to claim 1, characterized in that the anti-overflow partition is fixed perpendicularly to the ceiling of the tank.

3. The tank according to claim 1, characterized in that the second portion of the anti-overflow partition surrounding the periphery of the tank includes a series of corrugations (43).

4. The tank according to claim 3, characterized in that each corrugation in the second portion of the anti-overflow partition is positioned in such a manner as to be placed in register with a stiffening rib (44).

* * * * *